INVENTORS
CLIFFORD CLAYTON GOEHRING
ARTHUR CLIFFORD HART, JR.
BY
Frank J. Jordan
ATTORNEY

United States Patent Office 3,575,762
Patented Apr. 20, 1971

3,575,762
METHOD OF LAMINATING AN EXTRUDED THERMOPLASTIC FILM TO A PREHEATED THIN METAL FOIL WEB
Clifford Clayton Goehring, Princeton, and Arthur C. Hart, Jr., Ironia, N.J., assignors to American Can Company, New York, N.Y.
Continuation-in-part of abandoned application Ser. No. 625,359, Mar. 23, 1967. This application Sept. 23, 1969, Ser. No. 867,112
Int. Cl. B29c *19/00*
U.S. Cl. 156—244
9 Claims

ABSTRACT OF THE DISCLOSURE

A method of adhering a molten, synthetic, thermoplastic, film-forming, polymeric material to a metal foil web in a continuous web process to form a laminate. In order to eliminate wrinkling of the thin metal foil when it is heated to the extrusion temperature, the foil, in its original coil is preheated and then maintained at approximately the extrustion temperature throughout the laminating process.

BACKGROUND OF THE INVENTION

This application is a continuation-in-part of application Ser. No. 625,359, filed Mar. 23, 1967, now abandoned.

This invention relates to a laminating process and more particularly to producing a laminate consisting of a thermoplastic film and a metal foil substrate in a continuous sheet process wherein the substrate is unwound from a coil and the thermoplastic film extruded and applied thereto in a continuous manner.

Heretofore, various treatments have been applied to the surfaces of sheet plastics to render them adherent to various polar materials. For example, chromic acid, hydrogen peroxide, and other substances have been employed for this purpose. In other cases, certain modifiers have been employed to impart a degree of adhesiveness between various material and polyethylene surfaces. Disadvantages, such as corrosiveness and limitations as to the types of materials with which adhesiveness is obtained, were encountered in the above methods.

In the lamination of thermoplastic film to a web substrate it is well known in the art of coating paper to preheat the web prior to lamination. Such techniques are shown in U.S. Pats. 2,165,432, 3,196,063, and 3,323,965.

When the substrate is a metallic foil it is also well known that preheating is useful to enhance adhesion and additionally help the off-machine strength. In general the prior art employs the use of hot coating rolls for this purpose. However, temperatures are limited to about 180° F., as the foil striates and wrinkles due to expansion. Attempts have also been made to heat the foil by impinging hot gases, as it is carried unsupported to the extruder nip. If temperatures above 180° F. are employed to heat a thin metal foil web (0.35 to about 3 mils in thickness), severe wrinkles appear in the material and the thermoplastic film cannot be laminated to the foil without trapping air between the substrate and the thermoplastic, thus resulting in poor adhesion.

According to the present invention, a method is provided to adhere to a thermoplastic film to a metal foil substrate in a manner which is readily adaptable to produce a laminate in a manner commensurate with the economics of present day mass-production practices. The method of the present invention utilizes a combination of method steps which are effective to produce a laminate in an efficient manner without the application or use of separate adhesive materials and eliminates the wrinkling of thin metal foil previously encountered when the foil is heated to temperatures approaching the laminating temperature.

According to the invention, a thermoplastic film is extruded and passed onto the surface of a traveling metal foil web substrate which has been pre-heated in coil form. The temperature of the foil as it is uncoiled is maintained as close to the coil temperature as possible. By preheating and maintaining the foil at a suitable temperature, wrinkling of the foil is prevented. Initial contact between the extruded film and the foil web takes place on a support element at an elevated temperature so that the extruded film and the foil are brought together at a temperature significantly above the melting point of the thermoplastic film. Adhesion is promoted by maintaining the foil web and plastic film at the elevated temperature for a period of time. The extruded thermoplastic film may be treated with ozone before it is brought into contact with the foil thereby to promote adhesion between the two materials. The thermoplastic film may also be subjected to an electrostatic charge to cause the film to lay flat on the foil and thereby promote good contact therebetween.

SUMMARY OF THE INVENTION

In laminating an extruded thermoplastic film to a metal foil web substrate in a continuous process, the plastic film is extruded and passed onto the surface of the travelling substrate web which has been pre-heated to an elevated temperature. The substrate web passes over a support element and initial contact between the extruded film and the substrate web takes place on the support element at an elevated temperature. To avoid wrinkling of the substrate web, the entire roll of substrate web is heated prior to lamination to the plastic film and maintained in its heated condition as it is unwound. The extruded film may be treated with ozone before it is brought into contact with the substrate web and it may also be subjected to an electrostatic charge to promote good adhesion and contact between the plastic film and the substrate web.

DESCRIPTION OF THE PREFERRED EMBODIMENT

Figure 1:
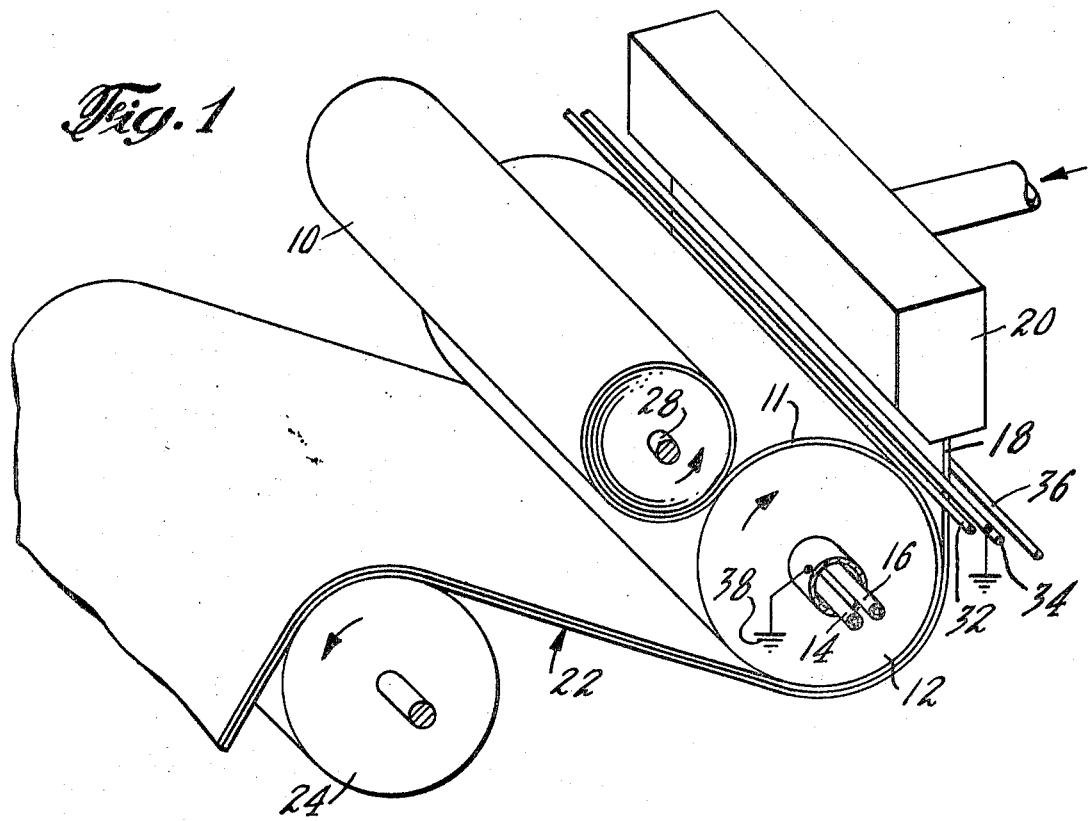
FIG. 1 is a schematic view, in perspective, illustrating a method of continuously forming a laminate in accordance with this invention but with the heating means for the foil not being shown for the sake of clarity.
Figure 2:
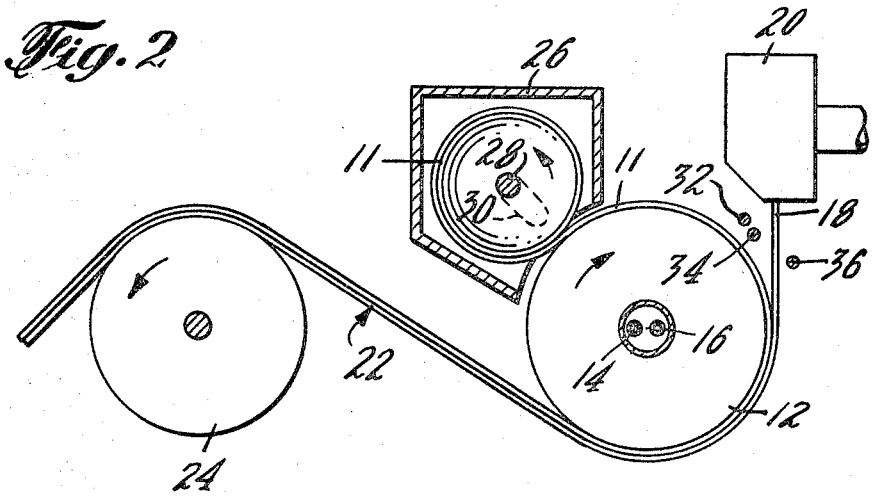
FIG. 2 is a longitudinal end view of the parts shown in FIG. 1 including the heating means for the foil.

A substrate in the form of heated coiled roll 10 of thin metal foil, such as aluminum, is disposed adjacent a support element in the form of a casting roll 12 and is adapted to unwind a continuous sheet of pre-heated foil 11 onto the casting roll 12, the latter being driven by suitable means not shown. The casting roll 12 is heated, for example, by circulating a heater fluid (e.g. hot oil) through internal chambers or passages (not shown) within the roll 12. The heated fluid may be recirculated through the conduits 14 and 16. A continuous sheet 18 of molten, synthetic, thermoplastic, film-forming, polymeric material (e.g. polyethylene) is extruded from an extrusion die 20 of conventional design having a slot orifice onto the surface of the foil 11 as the latter passes over the heated casting roll 12. It will be apparent from the drawings that a laminate 22 is formed as the foil 11 is continuously unwound onto the casting roll 12 and the polymeric film 18 is brought into contact with the foil on the casting roll 12. The newly formed laminate 22 is carried for a distance around the casting roll 12 and thereafter passed onto a chill roll 24 which is suitably cooled by means that are not shown, for example, by circulating or passing a cooling fluid through passages or chambers therein.

Adhesion between the extruded film 18 and foil 11 is promoted by effecting the laminating process under elevated temperature conditions whereby the foil 11 and film 18 are brought together at an elevated temperature and maintained at an elevated temperature for a period of time as the newly formed laminate 22 travels around with the casting roll 12. Accordingly, the entire coiled roll 10 is heated in an oven indicated schematically at 26. The coiled roll 10 of foil 11 may rest directly on the casting roll 12. This may be effected by mounting the coil support axis 28 in inclined slideways 30 so that the weight of the foil will keep it in contact with the casting roll 12.

The entire coil 10 is heated to alleviate wrinkling problems, which are encountered when cold thin metal foil is heated to the laminating temperature as it is uncoiled. Thus, with the arrangement shown, it is possible to heat the complete coil 10 to any desired temperature without encountering wrinkling problems of the type which would tend to occur if only sections of the web were heated after it was uncoiled.

The casting roll 12 is also heated, as previously described, to the desired temperature. The polymeric film 18 is of course, extruded at an elevated temperature so that separate heating means for the extruded film is not required. It will be observed that the newly formed laminate 22 is carried over the casting roll 12, in its elevated temperature, for a distance thereby to improve the bond.

To promote adhesion between the film 18 and the foil 11, a corona or other ozone-producing source may be employed to treat the surface of the film 18 before it contacts the foil 11. To this end, two electrodes 32 and 34 are disposed between the film 18 and the foil 11 just before the film contacts the foil. A suitable source of A.C. power (not shown) is imposed on these electrodes 32, 34 whereby a high-frequency A.C. corona is generated between the two electrodes 32, 34 near the point of contact between the plastic film 18 and the foil 11. The corona thereby generated produces ozone which treats the surface of the plastic film 18 and promotes its adhesion to the foil 11.

To forcibly bring the film 18 into intimate contact with the foil 11, an electrostatic charge may be imposed on the surface of the film 18. Thus, a wire electrode 36 or other metallic conductor is disposed between the slot orifice of the extruder 20 and the point at which the extruded film 18 touches the foil 11 on the heated casting roll 12. Sufficient voltage is supplied from a D.C. power supply (not shown) to the wire electrode 36 to provide an electrostatic charge on the surface of the polymeric film 18, thereby to force the film 18 into intimate contact with the foil sheet 11. The foil 11 is grounded through the casting roll 12 as indicated at 38. By way of example, details of an arrangement for imposing an electrostatic charge on a sheet of plastic film are disclosed in U.S. Pat. 3,223,757.

Experiments have shown that in practicing the invention, it is possible to obtain an inseparable bond between a polyethylene film (of 4 mils, for example) and one mil thick 1100 aluminum foil. It has been determined that time and temperature affect the efficiency and ability to produce an inseparable bond in the manner herein described. Thus, in one example, it was found that an inseparable bond (greater than 2 lbs. per inch for a 1 mil plastic film of branched polyethylene) could be obtained for a particular speed (e.g. 5 feet per minute) only for laminating temperatures above approximately 300 to 350° F., preferably above 350° F.

In another experiment, it was found that adhesion properties dropped for higher laminating speeds. Other experiments have indicated that greater adhesiveness and bonding strength were facilitated by utilizing higher laminating temperatures and providing longer periods of contact between the plastic web and foil. Thus, in one example, it was difficult to obtain an inseparable bond (greater than 2 lbs. per inch) at lower temperatures (e.g. below 300 to 350° F.) even at very long times. However, in other examples, an inseparable bond was obtained in less than 2 seconds at 600° F., but at 400° F., more than 20 seconds was required. In a further experiment, an inseparable bond could not be achieved, even with ozone treatment of the plastic film, when the casting-roll temperature was less than 300 to 350° F.

In an example of a successful procedure, a coil of 1 mil thick soft 1100 aluminum foil 11 was pre-heated in an oven at 500° F. for two hours in order to insure uniform temperature throughout the metal coil 10. The hot coil 10 was then placed in the heated oven 26 that maintained the coil temperature at 500° F., but permitted the foil 11 to be uncoiled and fed to the 500° F. casting roll 12. No wrinkles were observed in the foil. A 4 mil polyethylene film was extruded at 550° F. from the die 20 onto the surface of the hot foil. Excellent adhesion of the polyethylene to the foil was obtained. Keeping the foil at substantially the temperature of the casting roll resulting in a wrinkle free foil surface on the casting roll which resulted in excellent wetting by the polyethylene film and excellent adhesion between the film and substrate.

When the foregoing run was repeated without pre-heating the coil, but only unwinding an unheated coil directly onto the hot casting roll, longitudinal wrinkles formed in the 1 mil aluminum foil as it wound around the hot roll.

It is apparent that due to the thermal expansion characteristics of thin metal foil, elongation or stretching will occur to a greater degree than with paper. When the cold foil web is heated to substantially the laminating temperature, the foil is in tension and wrinkling is quite pronounced.

For foil thickness of from 0.35 to 3 mils the coil pre-heating process significantly eliminates the wrinkling problem generally encountered in laminating extruded thermoplastic films to such thin metal foil at elevated temperatures. Thus for polyethylene which may be extruded at temperatures from 350° to 625° F., the foil coil would be pre-heated to the extrusion temperature range and maintained at such temperature during uncoiling and lamination of the thermoplastic to the foil web.

In the illustrated embodiment, the lamination is effected on a heated support element (i.e. the casting roll 12). It will be understood that alternatively, other arrangements may be employed. For example, the casting roll 12 may be replaced by a support element in the form of an endless stainless steel belt (not shown) or the like which passes through a heated zone (e.g. through an oven). Also instead of having the coiled substrate 10 in contact with the support element, there may be a space therebetween and the axis of the coiled substrate 10 fixed instead of being movable toward the support element 12 as in the illustrated embodiment. With this alternate arrangement, means in the form of a hot-air jump or uniform temperature zone may be provided between the coiled substrate 10 and the support element. The newly formed laminate may be maintained at an elevated temperature for a prescribed period of time to improve the bond by carrying it over the casting roll for a distance, as in the illustrated embodiment, or by exposing the newly formed laminate to a heating zone (e.g. an oven or other heat-producing device) after said laminate has travelled off of the support element.

Although in the above description reference has been made from time to time to foil, aluminum foil, and polyethylene, it will be understood that the principles of the present invention may be utilized in obtaining similar results with other materials. Besides polyethylene, other synthetic, thermoplastic, film-forming, polymeric materials such as other olefins, vinyls, etc. may be employed. The foil or substrate may include various other metallic foils such as ferrous metals (both coated and uncoated), cuprous alloys, etc.

From the above description it will be seen that adhesion is promoted by maintaining the foil and plastic film at an elevated temperature for a period of time after the foil and plastic have been brought into contact with one another. Also, maintaining the support element and foil at substantially the same temperature and heating the entire coil of foil alleviates wrinkling problems of the foil. Further, the corona or other ozone-producing source treats the surfaces of the film to promote adhesion between the film and foil. Also, charging the plastic film with electrostatic charge effects intimate contact between the film and the foil, thereby promoting good adhesion.

It is thought that the invention and many of its attendant advantages will be understood from the foregoing description and it will be apparent that various changes may be made in the steps of the process described and their order of accomplishment without departing from the spirit and scope of the invention or sacrificing all of its material advantages, the process hereinbefore described being merely a preferred embodiment thereof.

We claim:

1. In a method of continuously laminating a thermoplastic film to a web of thin metallic foil substrate wherein said substrate is heated to an elevated temperature without wrinkling and said film is hot extruded onto said substrate, the improvement comprising the steps of:
   heating an entire coil of said foil substrate to substantially the elevated temperature of said hot extruded film;
   maintaining said elevated temperature in said substrate while unwinding said coiled substrate, thereby preventing wrinkling of said foil substrate;
   extruding a thermoplastic film at substantially the same temperature as said substrate temperature onto said substrate;
   maintaining the newly formed laminate for a period of time at a sufficient temperature to effect bonding of said film to said substrate; and
   cooling the newly formed laminate.

2. The method of claim 1 further including enclosing said coil within an enclosure and unwinding said substrate directly from said enclosure.

3. The method of claim 1 including the step of maintaining the coiled substrate in contact with a support element.

4. The method of claim 3 wherein said heated substrate is unwound onto said support element and carried on the latter for a distance before said extruded film contacts said substrate.

5. The method of claim 3 wherein said substrate and said support element are maintained at substantially the same temperature.

6. The method of claim 1 wherein said substrate is aluminum foil having a thickness of from 0.35 to 3 mils.

7. The method of claim 1 wherein said thermoplastic film is polyethylene and is extruded at a temperature of from 350° F. to 625° F.

8. The method of claim 7 wherein said extrusion temperature is from about 500° F. to 625° F.

9. In a method of continuously laminating a thermoplastic film to a web of metallic foil substrate having a thickness of from about 0.35 to about 3 mils wherein said substrate is heated to an elevated temperature without wrinkling and said film is hot extruded at a temperature of about 350° F. to 625° F. onto said substrate, the improvement comprising the steps of:
   heating within an enclosure an entire coil of said substrate to substantially the elevated temperature of said hot extruded film;
   maintaining said elevated temperature in said substrate while unwinding said coiled substrate to prevent wrinkling thereof by maintaining said coiled substrate in contact with a support element upon which said substrate is directly unwound, said support element being maintained at substantially the same temperature as said coiled substrate;
   carrying said heated substrate upon said support element for a distance before said film contacts said substrate;
   extruding said thermoplastic film at a temperature of about 350° F. to 625° F. onto said substrate, said temperature being substantially the same as that of said substrate;
   maintaining the newly formed laminate for a period of time at a sufficient temperature to effect bonding of said film to said substrate; and
   cooling the newly formed laminate.

References Cited

UNITED STATES PATENTS

| | | | |
|---|---|---|---|
| 3,230,126 | 1/1966 | Craver | 156—244 |
| 3,238,284 | 3/1966 | Sutton | 156—244X |
| 3,343,663 | 9/1967 | Seidler | 156—244UX |
| 3,348,995 | 10/1967 | Baker et al. | 156—322X |
| 3,389,036 | 6/1968 | Rudolph et al. | 156—244 |
| 3,392,076 | 7/1968 | Van der Pals | 156—244 |
| 3,397,101 | 8/1968 | Rausing | 156—244X |
| 3,444,022 | 5/1969 | Bichsel | 156—322X |
| 3,445,326 | 5/1969 | Hurst | 156—244X |
| 3,140,196 | 7/1964 | Lacy et al. | 156—244X |

BENJAMIN R. PADGETT, Primary Examiner

S. J. LECHERT, JR., Assistant Examiner

U.S. Cl. X.R.

156—306, 322